US012192011B2

(12) United States Patent
He et al.

(10) Patent No.: US 12,192,011 B2
(45) Date of Patent: Jan. 7, 2025

(54) UPLINK CONTROL INFORMATION REPORTING

(71) Applicant: Apple Inc., Cupertino, CA (US)

(72) Inventors: Hong He, San Jose, CA (US); Dawei Zhang, Saratoga, CA (US); Fangli Xu, Beijing (CN); Jie Cui, San Jose, CA (US); Oghenekome Oteri, San Diego, CA (US); Wei Zeng, Saratoga, CA (US); Weidong Yang, San Diego, CA (US); Yang Tang, San Jose, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 489 days.

(21) Appl. No.: 17/593,581

(22) PCT Filed: Apr. 8, 2020

(86) PCT No.: PCT/CN2020/083730
§ 371 (c)(1),
(2) Date: Sep. 21, 2021

(87) PCT Pub. No.: WO2021/203287
PCT Pub. Date: Oct. 14, 2021

(65) Prior Publication Data
US 2022/0311555 A1    Sep. 29, 2022

(51) Int. Cl.
*H04L 1/18*    (2023.01)
*H04L 1/16*    (2023.01)
(Continued)

(52) U.S. Cl.
CPC .......... *H04L 1/1854* (2013.01); *H04L 1/1671* (2013.01); *H04L 1/1812* (2013.01); *H04L 5/001* (2013.01)

(58) Field of Classification Search
CPC ... H04L 1/1671; H04L 1/1812; H04L 1/1854; H04L 1/1858; H04L 1/1861; H04L 1/1896; H04L 5/001
See application file for complete search history.

(56) References Cited

U.S. PATENT DOCUMENTS

2013/0114474 A1    5/2013    Fu et al.
2013/0114575 A1    5/2013    Fu et al.
(Continued)

FOREIGN PATENT DOCUMENTS

CN    109155694    1/2019
CN    110875814    3/2020
(Continued)

OTHER PUBLICATIONS

MediaTek Inc., Multiple HARQ procedures and intra-UE UCI prioritization, 3GPP TSG RAN WG1 Meeting #98, R1-1908409, Aug. 17, 2019, 15 sheets.
(Continued)

*Primary Examiner* — Awet Haile
(74) *Attorney, Agent, or Firm* — Fay Kaplun & Marcin, LLP (57) ABSTRACT

A computer readable storage medium, a user equipment, a method and an integrated circuit that are used to perform operations. Operations include receiving, from a network, a plurality of Physical Downlink Shared Channel (PDSCH) transmissions in slots of a hybrid automatic repeating request acknowledgement (HARQ-ACK) window, decoding each of the PDSCH transmissions in the slots of the HARQ window, determining a HARQ-ACK feedback for each PDSCH transmission in the HARQ-ACK window, bundling the HARQ-ACK feedback for at least two of the PDSCH transmissions and reporting the bundled HARQ-ACK feedback for the HARQ window to the network.

16 Claims, 6 Drawing Sheets

(51) Int. Cl.
*H04L 1/1607* (2023.01)
*H04L 1/1812* (2023.01)
*H04L 1/1829* (2023.01)
*H04L 5/00* (2006.01)

(56) References Cited

U.S. PATENT DOCUMENTS

| | | | | |
|---|---|---|---|---|
| 2013/0182676 | A1* | 7/2013 | Lee | H04L 1/0029 |
| | | | | 370/329 |
| 2016/0234000 | A1* | 8/2016 | Lee | H04L 5/22 |
| 2021/0297191 | A1* | 9/2021 | Takeda | H04L 1/1825 |
| 2021/0329682 | A1* | 10/2021 | Takeda | H04W 72/0446 |
| 2022/0368471 | A1* | 11/2022 | Lin | H04L 1/1854 |

FOREIGN PATENT DOCUMENTS

| | | |
|---|---|---|
| EP | 2639984 | 9/2013 |
| JP | 2015-524205 | 8/2015 |
| JP | 2018-508145 | 3/2018 |
| WO | 2013/180958 | 12/2013 |
| WO | 2017/026972 | 2/2017 |
| WO | 2018/137206 | 8/2018 |
| WO | 2019/103905 | 5/2019 |
| WO | 2019/216727 | 11/2019 |

OTHER PUBLICATIONS

Huawei et al., "HARQ enhancement in NR unlicensed", 3GPP TSG RAN WG1 Meeting #99, R1-1911868, Nov. 18, 2019, 11 sheets.

* cited by examiner

UPLINK CONTROL INFORMATION REPORTING

BACKGROUND

A user equipment (UE) may establish a connection to at least one of a plurality of different networks or types of networks. For example, the UE may connect to a 5G new radio (NR) network. While connected to the network(s), the UE may utilize further network capabilities. For example, the UE may utilize a carrier aggregation (CA) functionality in which a primary component carrier (PCC) and at least one secondary component carrier (SCC) are used to communicate data over the various network bands. Because downlink (DL) CA increases the bandwidth over which a UE may receive information from the network, CA communicate with a network, CA may be one of the network functionalities that helps support ultra reliable and low latency communications (URLLC). URLLC is meant to service applications having stringent latency and reliability requirements.

However, in any network scheme the UE may have to feedback information to the network for various purposes. This feedback information may be Uplink Control Information (UCI). To support URLCC or any other high speed communications, new manners of effectively conveying the UCI information from the UE to the network are needed.

SUMMARY

According to some exemplary embodiments, a computer readable storage medium comprising a set of instructions is described. The set of instructions when executed by a processor cause the processor to perform operations including receiving, from a network, a plurality of Physical Downlink Shared Channel (PDSCH) transmissions in slots of a hybrid automatic repeating request acknowledgement (HARQ-ACK) window, decoding each of the PDSCH transmissions in the slots of the HARQ window, determining a HARQ-ACK feedback for each PDSCH transmission in the HARQ-ACK window, bundling the HARQ-ACK feedback for at least two of the PDSCH transmissions and reporting the bundled HARQ-ACK feedback for the HARQ window to the network.

Further exemplary embodiments include a user equipment having a transceiver and a processor. The transceiver is configured to connect to a network and receive a plurality of PDSCH transmissions in slots from the network. The processor is configured to decode each of the PDSCH transmissions in slots in a hybrid automatic repeating request acknowledgement (HARQ-ACK) window, determine a HARQ acknowledgment (HARQ-ACK) feedback for each PDSCH transmission in the HARQ-ACK window and bundle the HARQ-ACK feedback for at least two of the PDSCH transmissions. The transceiver is further configured transmit the bundled HARQ-ACK feedback for the HARQ window to the network.

Still further exemplary embodiments include a computer readable storage medium comprising a set of instructions is described. The set of instructions when executed by a processor cause the processor to perform operations including receiving a plurality of Physical Downlink Shared Channel (PDSCH) transmissions in slots from a network, wherein the plurality of PDSCH transmissions in slots comprises a first set of PDSCH transmissions in slots corresponding to a first service and a second set of PDSCH transmissions in slots corresponding to a second service, decoding each of the PDSCH transmissions in slots in a hybrid automatic repeating request acknowledgment (HARQ-ACK) window, determining a HARQ acknowledgment (HARQ-ACK) feedback for each PDSCH transmissions in the HARQ-ACK window and reporting the HARQ-ACK feedback for the HARQ window to the network.

DETAILED DESCRIPTION

The exemplary embodiments may be further understood with reference to the following description and the related appended drawings, wherein like elements are provided with the same reference numerals. The exemplary embodiments relate to combining hybrid automatic repeating request (HARQ) acknowledgment (ACK) information to be included in UCI transmissions to provide for a more efficient manner of communicating the UCI information from a UE to a network.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to the network being a fifth generation (5G) new radio (NR) network and various types of information and transmissions related to 5G NR networks such as a Downlink Assignment Index (DAI), a Physical Uplink Control Channel (PUCCH), etc. It should be understood that any reference to 5G NR or the specific information or transmissions related to 5G NR networks is merely provided for illustrative purposes. Other types of networks may refer to the same concepts in different manners and the exemplary embodiments may apply to any network having the characteristics of the exemplary networks described herein.

Throughout this description, it will be described that uplink control information (UCI) will be reported back to the network. This UCI information will be described as being "bundled," "combined," "concatenated," "compressed," or "multiplexed." It should be understood that each of these terms describe one or manners of combining multiple pieces of UCI information into a format that is smaller than the sum of the individual pieces of information. Exemplary manners of combining the UCI information will be provided below.

In addition, a general description of carrier aggregation (CA) is described below. However, the exemplary embodiments do not require that carrier aggregation be activated. As will be described in greater detail below, the exemplary embodiments are described with reference to a UE that is receiving downlink (DL) communications on at least two component carriers (CCs). CA is one exemplary manner of a UE receiving DL communications on two or more CCs. Those skilled in the art will understand that the exemplary embodiments may be applied to any scheme where the UE is receiving DL communications on two or more CCs, e.g., any dual connectivity (DC) scheme.

In some exemplary embodiments, the network may support carrier aggregation (CA) with a plurality of CCs. Each CC may represent a channel that facilitates communication between the UE and the network over a particular frequency band. A plurality of CCs may correspond to the same frequency band, each CC may correspond to a different band or a combination thereof. Further, each CC has a particular bandwidth, the more CCs the UE is configured with the more bandwidth that is available for communications with the network. CA may include a primary component carrier (PCC) and at least one secondary component carrier (SCC) that correspond to the same RAT being used to facilitate communication with the network. The PCC may be used, in part, for control information such as scheduling requests, uplink grants, downlink grants, etc. CA functionality enables the PCC and at least one SCC to combine bandwidths to exchange data with the UE. Thus, with CA, the PCC may provide a first portion of a total bandwidth for data to be exchanged while the SCC may provide a second portion of the total bandwidth. The combination of a PCC and a single SCC may be characterized as a CC combination that includes two carriers. To further increase the total available bandwidth for data to be exchanged with the UE, additional SCCs may be incorporated.

As described above, the UE may provide feedback information to the network for various purposes. This feedback information may include Uplink Control Information (UCI). In a 5G NR network, the UCI is typically sent back via the Physical Uplink Control Channel (PUCCH). The UCI may include hybrid automatic repeating request (HARQ) acknowledgment (ACK) information. Those skilled in the art will understand that HARQ is a form of error correction that may include encoding the original transmission with a forward error correction (FEC) code and sending parity bits that are used for correction at a later time, e.g., the HARQ retransmissions, when a receiver detects a problem with the UL transmission. Thus, for each data transmission from the network the UE may send a corresponding HARQ-ACK feedback to the network allowing the network to understand whether the UE correctly received the communication and whether the network should send HARQ retransmissions for those communications received incorrectly.

According to some exemplary embodiments, the HARQ-ACK communications by the UE may be spatially bundled by bundling or combining ACKs and NACKs for multiple codewords. This spatial bundling of HARQ-ACK information across codewords may reduce the amount of HARQ-ACK bits that are transmitted back to the network. This reduction in the amount of data that is sent back to the network may reduce network traffic and latency in communications. In some exemplary embodiments, formats for downlink control information (DCI) are provided to support the UE in bundling the HARQ-ACK information. In some exemplary embodiments, manners of resolving collisions between different types of UCI information are also described.

Figure 1:
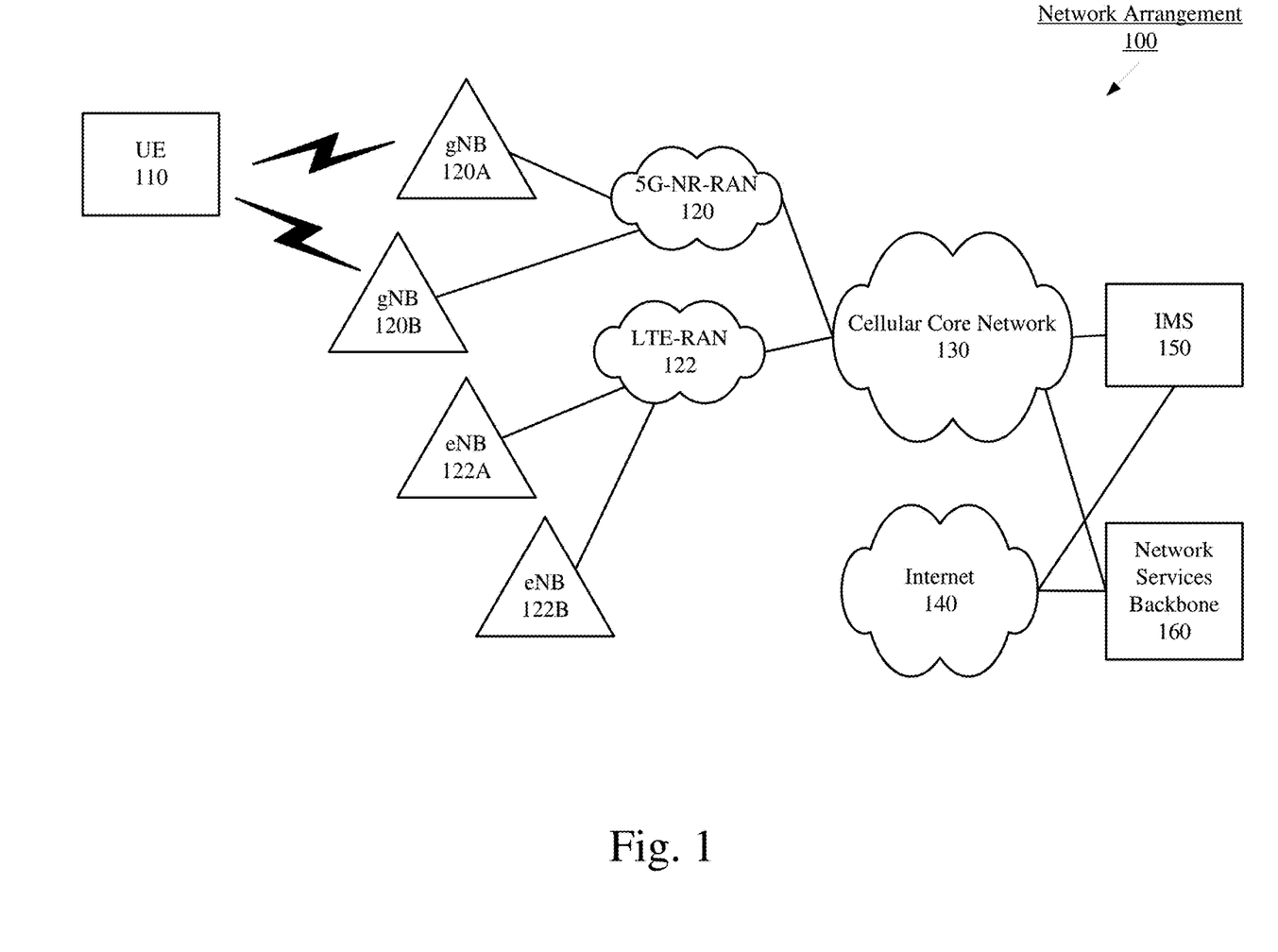
FIG. 1 shows an exemplary network arrangement according to various exemplary embodiments.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120 and an LTE radio access network (LTE-RAN) 122. However, it should be understood that the UE 110 may also communicate with other types of networks (e.g. legacy cellular network, WLAN, etc.) and the UE 110 may also communicate with networks over a wired connection. With regard to the exemplary embodiments, the UE 110 may establish a connection with the 5G NR-RAN 120 and/or the LTE-RAN 122. Therefore, the UE 110 may have both a 5G NR chipset to communication with the 5G NR-RAN 120 and an LTE chipset to communicate with the LTE-RAN 122.

The 5G NR-RAN 120 and the LTE-RAN 122 may be portions of cellular networks that may be deployed by cellular providers (e.g., Verizon, AT&T, Sprint, T-Mobile, etc.). These networks 120 and 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The use of a separate 5G NR-RAN 120 and an LTE-RAN 122 is merely provided for illustrative purposes. An actual network arrangement may include a radio access network that includes architecture that is capable of providing both 5G NR RAT and LTE RAT services. For example, a next-generations radio access network (NG-RAN) may include a next generation Node B (gNB) that provides 5G NR services and a next generation evolved Node B (ng-eNB) that provides LTE services. The NG-RAN may be connected to at least one of the evolved packet core (EPC) or the 5G core (5GC).

The UE 110 may connect to the 5G NR-RAN 120 via at least one of the next generation Node B (gNB) 120A or the gNB 120B. The UE 110 may connect to the LTE-RAN 122 via at least one of the evolved Node B (eNB) 122A or eNB 122B. Those skilled in the art will understand that any association procedure may be performed for the UE 110 to connect to the 5G NR-RAN 120 or the LTE-RAN 122. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the gNB 120A of the 5G NR-RAN 120). Similarly, for access to LTE services, the UE 110 may associate with eNB 122A. However, as mentioned above, the use of the 5G NR-RAN 120 and the LTE-RAN 122 is for illustrative purposes and any appropriate type of RAN may be used.

In addition to the RANs 120 and 122, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the EPC and/or the 5GC. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
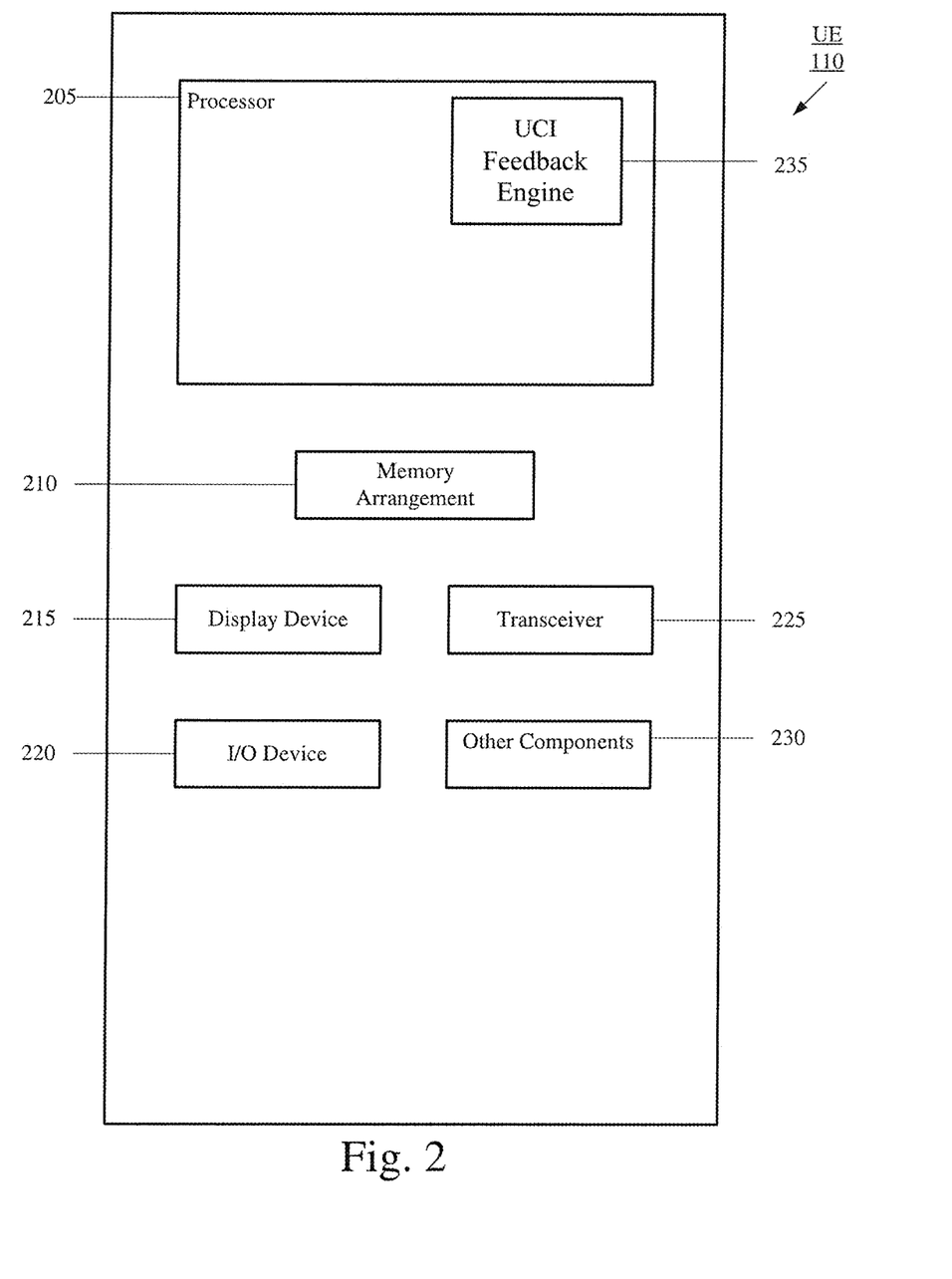
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a UCI feedback engine 235. The UCI feedback engine 235 may perform the bundling of the HARQ-ACK information within the UCI and resolve the UCI collisions as will be described in greater detail below.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122 etc. Accordingly, the transceiver 225 may operate on a variety of different frequencies or channels (e.g., set of consecutive frequencies).

In the following examples, it may be considered that the UE 110 is connected to the 5G NR-RAN 120 with CA active. The gNB 120A may be considered to be serving the PCC (also referred to as CC0 hereinafter) and the gNB 120B may be considered to be serving the SCC (also referred to as CC1 hereinafter). Thus, the control information being communicated to the UE 110 will be from the gNB 120A via the PCC. Similarly, the UCI information sent from the UE 110 to the network will be to the gNB 120A. Those skilled in the art will understand that this is only one possible arrangement of many arrangements and is merely being provided to provide context for the description of the exemplary embodiments.

As described above, in some exemplary embodiments, the UE 110 may spatially bundle ACKs and NACKs for multiple codewords in the HARQ-ACK feedback that is reported to the gNB 120A. To accomplish this bundling, the UE 110 may receive information from the gNB 120A as to the number of transmissions that the UE 110 will be receiving and are associated with a single PUCCH for HARQ-ACK feedback.

In some exemplary embodiments, this information may be provided to the UE 110 via a Downlink Assignment Index (DAI) and more specifically a counter DAI (C-DAI). The DAI provides the UE 110 with an indication of each of the scheduled downlink data transmissions on the Physical Downlink Shared Channel (PDSCH). The C-DAI provides the number of scheduled PDSCH transmissions.

Figure 3:
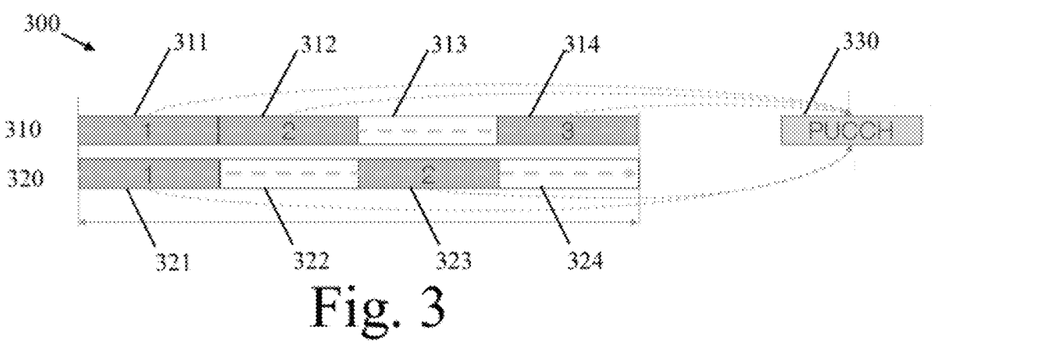
FIG. 3 shows an example of a first transmission schedule illustrating the bundling of HARQ-ACK information on a per component carrier (CC) basis according to various exemplary embodiments.

FIG. 3 shows an example of a first transmission schedule 300 illustrating the bundling of HARQ-ACK information on a per component carrier (CC) basis according to various exemplary embodiments. Throughout this description multiple transmission schedules are described. It should be understood that each of these transmission schedules are provided to illustrate the description of the exemplary embodiments. The exemplary embodiments are not limited to the exemplary transmission schedules as one of ordinary skill in the art will understand how to apply the principles described herein to many differing transmission scenarios.

The transmission schedule 300 shows PDSCH slots 311-314 for CC0 310 and PDSCH slots 321-324 for CC1 320. The shaded slots 311, 312, 314, 321 and 323 are slots that have scheduled PDSCH transmissions, while the remaining slots 313, 322 and 324 are not scheduled. As described the DAI that is transmitted in a DCI by the gNB 120A on the Physical Downlink Control Channel (PDCCH) will indicate the scheduled slots to the UE 110. Similarly, the C-DAI provides the UE with the number of scheduled slots. Thus, it should be understood that scheduled slots will have PDSCH transmissions scheduled therein and throughout this description, the term slot may also be used to refer to the PDSCH transmissions that are scheduled for the slot.

In this example, the count provided in the C-DAI is on a CC basis, e.g., the C-DAI for CC0 310 is updated from one to three (3) as shown by the numbers in the scheduled slots 311, 312 and 314 and the C-DAI for CC0 320 is updated from one to two (2) as shown by the numbers in the scheduled slots 321 and 323. C-DAI denotes the accumulative number of PDCCH(s) with assigned PDSCH transmission(s) and PDCCH indicating downlink SPS release up to the present slot within a HARQ-ACK window. It should be understood that in this example, the HARQ-ACK window is four (4) slots. The size of the HARQ-ACK window may be configured for the UE 110 via radio resource control (RRC) signaling with the 5G NR-RAN 120 for this and the other examples described herein. In addition, the C-DAI may be updated from monitoring occasion to monitoring occasion.

The transmission schedule 300 also shows the PUCCH slot 330 transmitted by the UE 110 to the gNB 120A that provides the HARQ-ACK feedback. As described above, the HARQ-ACK feedback in the PUCCH slot 330 comprises spatially bundled ACKs and NACKs for multiple codewords. In some exemplary embodiments, the ACKs and NACKs may be bundled using a logical AND operation. However, those skilled in the art will understand that there may be other operations used to bundle the ACKs and NACKs.

In the example of FIG. 3, the HARQ-ACK feedback for the slots 311 and 312 will be bundled and reported in the PUCCH slot 330. In this exemplary embodiment, because the HARQ-ACK feedback is reported on a per CC basis, there is only one remaining scheduled slot 314 left for the CC0 310. Thus, the HARQ-ACK feedback for slot 314 does not have a corresponding slot to be bundled with, and thus the HARQ-ACK feedback for slot 314 in PUCCH slot 330 will be only the ACK or NACK for this slot 314. The HARQ-ACK feedback for the CC1 320 will be the bundled HARQ-ACK for the slots 321 and 323. Thus, as can be seen from this example, if there is an even number of scheduled slots, the HARQ-ACK feedback information may be reduced by a factor of 2 based on the bundling performed by the UE 110. Alternatively, the HARQ-ACK bits that are associated with all PDSCHs on a single CC e.g. PDSCH in the slot 311/312 as well as 314 are bundled together to generate a single bit for CC 1 320.

Figure 4:
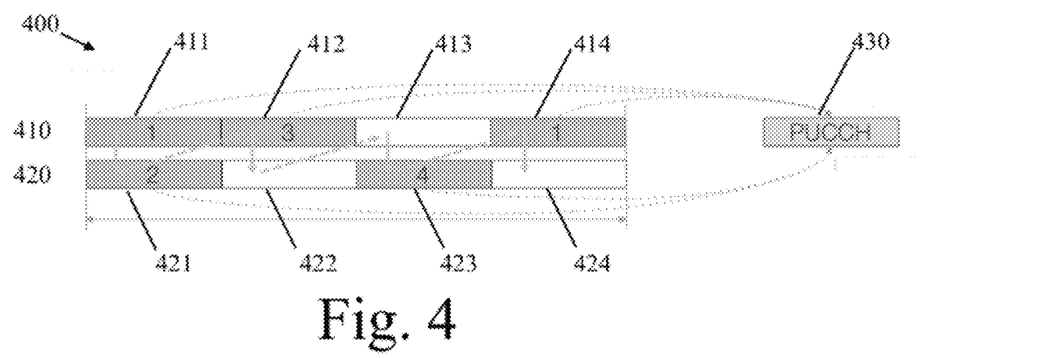
FIG. 4 shows an example of a second transmission schedule illustrating the bundling of HARQ-ACK information across CCs according to various exemplary embodiments.

FIG. 4 shows an example of a second transmission schedule 400 illustrating the bundling of HARQ-ACK information across CCs according to various exemplary embodiments. The transmission schedule 400 is substantially similar to the transmission schedule 300, except the C-DAI is accumulated across CCs rather than being limited to a per-CC basis as in FIG. 3. This accumulation across CCs will be described in greater detail below. The transmission schedule 400 shows PDSCH slots 411-414 for CC0 410 and PDSCH slots 421-424 for CC1 420. The shaded slots 411, 412, 414, 421 and 423 are scheduled PDSCH slots, while the remaining slots 413, 422 and 424 are not scheduled.

In this example, the count provided in the C-DAI is accumulated across CCs. In this example, the HARQ-ACK window may also be considered to be 4 slots. However, as described above, the gNB 120A may signal the UE 110 to use any size HARQ-ACK window. Thus, in this example, the scheduled slots are accumulated and numbered from 1-4 corresponding to the window size and then the next window is started at 1 again. As can be seen the accumulation is performed in slot order with the CC having a smaller index (e.g., CC0 410) having priority over any CCs having a larger index (e.g., CC1 420). Thus, in the example, the C-DAI indicates there are five (5) scheduled slots numbered 1-4 and 1.

The transmission schedule 400 also shows the PUCCH slot 430 transmitted by the UE 110 to the gNB 120A that provides the HARQ-ACK feedback. Similar to the example described above with respect to FIG. 3, the HARQ-ACK feedback in the PUCCH slot 430 comprises spatially bundled ACKs and NACKs for multiple codewords based on the C-DAI. For example, the HARQ-ACK information for PDSCH slot 411 of CC0 410 may be bundled with the HARQ-ACK information for PDSCH slot 421 of CC1 420 using, for example, the logical AND operation (or any other data combination operation).

Figure 5:
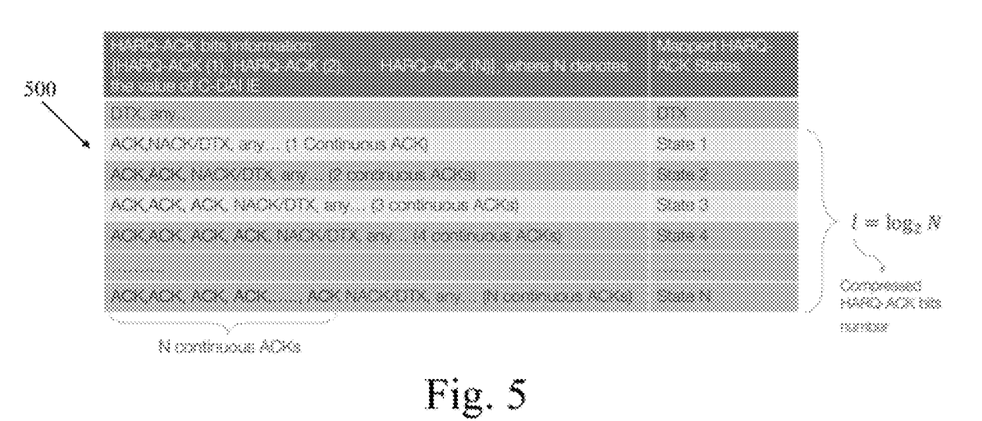
FIG. 5 shows an exemplary table showing a HARQ-ACK feedback state based on the feedback from the UE according to various exemplary embodiments.

FIG. 5 shows an exemplary table 500 showing a HARQ-ACK feedback state based on the feedback from the UE 110 according to various exemplary embodiments. From the above description, it should be understood that the HARQ-ACK feedback state indicates a number of continuous PDSCH slots that have been successfully decoded by the UE 110 starting from the first scheduled PDSCH subframe with C-DAI=1. For example, referring to table 500, State 1 indicates that one (1) PDSCH slot (e.g., the first PDSCH slot in the HARQ-ACK window) has been decoded successfully. In a further example as shown in table 500, State 4 indicates that four (4) continuous PDSCH slots (starting from the first slot of the HARQ-ACK window) have been decoded successfully.

Thus, after receiving the HARQ-ACK feedback, the gNB 120A may determine how many PDSCH slots starting from the first scheduled PDSCH slot with C-DAI=1 have been successfully decoded by UE. The gNB 120A may then only retransmit the PDSCH slots having a higher C-DAI than the last successfully decoded slot.

In other exemplary embodiments, the UE 110, instead of reporting the individual ACKs and NACKs to the gNB 120A may report the states as shown in the table 500 of FIG. 5. For example, referring to the example of FIG. 4, it may be considered that the HARQ-ACK window is 4 slots and the UE 110 successfully decodes the first three (3) slots of the window (e.g., C-DAI=1-3). In this example, the UE 110 may report State 3 as shown in table 500 to the gNB 120A in the PUCCH. This will indicate to the gNB 120A that the first three (3) scheduled PDSCH slots starting with C-DAI=1 have been decoded successfully. The gNB 120A may then retransmit the scheduled PDSCH slots having a C-DAI>3 (e.g., the slot having C-DAI=4 for this example).

In other exemplary embodiments, a time-domain HARQ-ACK bundling may be provided. For example, HARQ-ACK bits may be bundled across slots within a HARQ-ACK bundling window. The bundling may be performed by a logical AND operation of all the corresponding individual HARQ-ACK bits on a per codeword basis. This time-domain HARQ-ACK bundling may be performed on a per CC basis. For example, if a CC includes a single codeword, the HARQ-ACK feedback for each scheduled slot in the HARQ-ACK window of the CC may be combined, e.g., using the logical AND operation. Thus, this bundling will result in one HARQ-ACK bit being generated per CC. This single HARQ-ACK bit for the CC may then be reported by the UE 110 to the gNB 120A. In another example, if a CC includes two codewords, the HARQ-ACK feedback for each codeword for each scheduled slot in the HARQ-ACK window of the CC may be combined, e.g., using the logical AND operation. Thus, this bundling will result in two HARQ-ACK bits being generated per CC.

Figure 6:
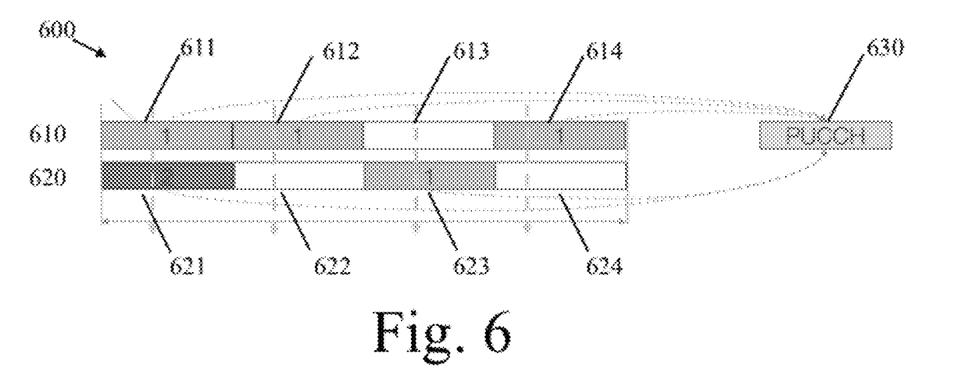
FIG. 6 shows an example of a third transmission schedule illustrating the bundling of HARQ-ACK information in the CC domain according to various exemplary embodiments.

FIG. 6 shows an example of a third transmission schedule 600 illustrating the bundling of HARQ-ACK information in the CC domain according to various exemplary embodiments. The transmission schedule 600 will be used to describe exemplary embodiments related to CC-domain HARQ-ACK bundling. The transmission schedule 600 shows PDSCH slots 611-614 for CC0 610 and PDSCH slots 621-624 for CC1 620. The shaded slots 611, 612, 614, 621 and 623 are scheduled PDSCH slots, while the remaining slots 613, 622 and 624 are not scheduled.

The CC-domain HARQ-ACK bundling may include two separate bundling operations. In a first operation, the spatial HARQ-ACK bundling may be performed across multiple codewords within each PDSCH transmission. For example, referring to FIG. 6, the HARQ-ACK feedback for each codeword for each individual PDSCH slot (e.g., slot 611) may be bundled. Thus, in the example of FIG. 6, after the first operation there may be five (5) bundled HARQ-ACKs corresponding to the five (5) scheduled PDSCH slots 611, 612, 614, 621 and 623. As described above, the bundling is based on bundling for two or more codewords within each PDSCH slot.

In a second operation, a bundled HARQ-ACK generated in the first operation is further bundled across CCs within each slot. For example, the bundled HARQ-ACK for slot 611 in the CC0 610 may be bundled with the corresponding slot 621 in the CC1 620. In some exemplary embodiments, the C-DAI may be accumulated across CCs on a per monitoring occasion basis in the CA scenario.

Figure 7:
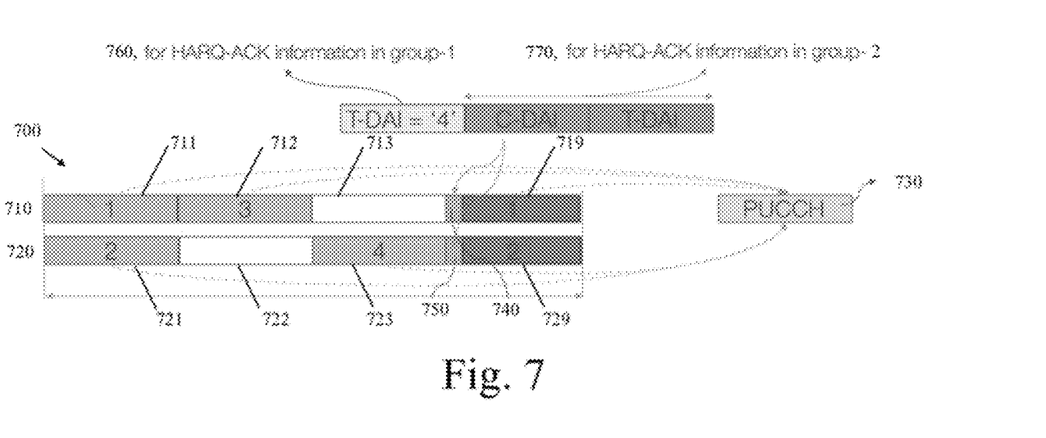
FIG. 7 shows an example of a fourth transmission schedule 700 illustrating the handling of HARQ-ACK feedback when there are two different types of PDSCH slots within the HARQ-ACK window according to various exemplary embodiments.

FIG. 7 shows an example of a fourth transmission schedule 700 illustrating the handling of HARQ-ACK feedback when there are two different types of PDSCH slots within the HARQ-ACK window according to various exemplary embodiments. The transmission schedule 700 will be used to describe exemplary embodiments related to concatenating HARQ-ACKS for PDSCH slots having two different PDSCH groups. For example, each PDSCH group maybe associated with one service type. In one exemplary embodiment, a first PDSCH group is associated with a URLCC service and a second PDSCH group is associated with an enhanced Mobile Broadband (eMBB) service. A group index of a PDSCH may be explicitly signaled as part of the DCI format, e.g., a bit of the DCI may be set to 0 to indicate the PDSCH slot is a member of the first group while the bit may be set to 1 to indicate the PDSCH slot is a member of the second group.

Referring to FIG. 7, the transmission schedule 700 shows the slots 711-713 for CC0 710 and the slots 721-723 for CC1 720 are used for the first group PDSCH transmissions. Again, the shaded slots 711, 712, 721 and 723 are scheduled for first group PDSCH transmissions, while the remaining slots 713 and 722 are not scheduled. In addition, the transmission schedule 700 shows the slot 719 for CC0 710 and the slot 729 for CC1 720 are used for the second group PDSCH.

In some exemplary embodiments, the HARQ-ACK feedback may be bundled in the same manner as was described above for other exemplary embodiments and the UE 110 may then report the HARQ-ACK feedback to the gNB 120A via the PUCCH slot 730.

However, there may be some special cases with respect to the multiple groups of PDSCHs. For example, there may be situations where the corresponding PUCCH resources carrying HARQ-ACK bits for the two groups are overlapped. In this situation, the DCI that provided the scheduling information for the second group of PDSCH slots to the UE 110 may be modified. In the example of FIG. 7, the DCIs providing this scheduling information are shown in the transmission schedule 700 as DCI 740 for CC0 710 and DCI 750 for CC1 720.

An example of the DCIs 740 and 750 are shown above the transmission schedule 700. As shown in FIG. 7, the DCI format for DCIs 740 and 750 comprises a first portion 760 and a second portion 770. The second portion 770 includes the information for the second group of PDSCH slots, e.g., the C-DAI and the total-DAI (T-DAI). However, the DCI format also includes first portion 760 that includes the T-DAI for the first group of PDSCH slots that are scheduled by other DCI formats transmitted in other slots 711/712/713/721/723. This provides the UE 110 with PDSCH scheduling information of the first group that includes the DL SPS release up to the slot i (e.g., in this example up to the location including slots 719 and 729). As shown in the transmission schedule 700, this information may be explicitly signaled in slot i using, for example, a 2-bit T-DAI 760.

In some exemplary embodiments, the value of T-DAI 760 may be equal or larger than the total number of scheduled group 1 PDSCH slots in the HARQ-ACK bundling window. This may provide the gNB 120A with an opportunity to schedule additional first group PDSCH transmissions after the second group PDSCH slots that are scheduled via DCIs 740/750. For example, the T-DAI in the example of FIG. 7 may be set to six (6) allowing two additional first group PDSCH transmissions to be scheduled later but still to feedback HARQ-ACK on PUCCH 730.

In the above examples, it was described that the UCI feedback (e.g., including the bundled HARQ-ACK operation) will be performed and reported back to the gNB 120A if it is transmitted over the PUCCH. However, in some exemplary embodiments, the gNB 120A may configure the UE 110 to perform the UCI multiplexing, including both HARQ-ACK bundling operation in FIG. 3/4/5/6 as well as the HARQ-ACK concatenation operation described in FIG. 7, in the PUCCH and/or the PUSCH. This configuration may be signaled to the UE 110 through higher layers (e.g., RRC signaling or a MAC CE) or through PDCCH signaling. In some embodiments, a common signaling may be specified to indicate enabling of UCI on both PUCCH and PUSCH. While, in other embodiments, separate signaling may be used to control UCI multiplexing operations independently for PUCCH and PUSCH transmission.

In some exemplary embodiments, the UE 110 may drop UCI information associated with lower priority services (e.g., eMBB traffic), if the UCI multiplexing for different service types is not enabled.

According to other aspects of the exemplary embodiments, additional fields may be specified. A first new field may be a PDSCH grouping index (DGI). The DGI field may be used to indicate the group index of a scheduled PDSCH transmission or SPS release. A second field may be a HARQ-ACK Request (AR). The AR field transmitted in slot i may trigger the UE to retransmit the HARQ-ACK bits corresponding to detection of DCI formats each providing a same value of indicated DGI field in the earlier slot. The UE 110 may append the HARQ-ACK information associated with the PDSCH group indicated by the DGI field to the newly generated HARQ-ACK information for the multiplexing UCI transmission occasion.

Figure 8:
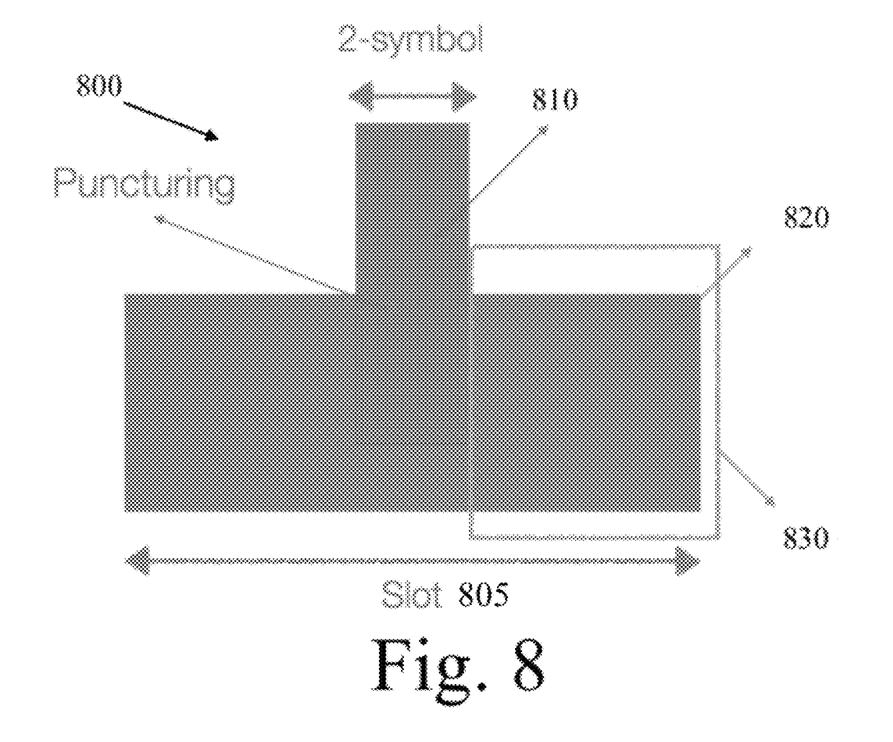
FIG. 8 shows an example of a UCI collision in an uplink (UL) slot according to various exemplary embodiments.

FIG. 8 shows an example of a UCI collision in an uplink (UL) slot 805 according to various exemplary embodiments. In the example of FIG. 8, it may be considered that there are two PUCCH transmissions scheduled for the slot 805. The first PUCCH transmission may be, for example, a PUCCH transmission 810 that includes the HARQ-ACK feedback for a URLLC service being used by the UE 110. The second PUCCH transmission may be, for example, a PUCCH transmission 820 that includes the HARQ-ACK feedback for an eMBB service being used by the UE 110. In this example, the URLLC PUCCH transmission 810 is shown as being two (2) symbols and may be considered to be "puncturing" the eMBB PUCCH transmission 820.

The exemplary embodiments may provide multiple manners of handling such a UCI collision. In general, the manners of handling the UCI collision may be based on the priority of the service for the PUCCH transmission. In the example of FIG. 8, it may be considered that the URLLC service has a higher priority than the eMBB service. However, it should be noted that the use of these two services are only exemplary and the UE 110 may be accessing other types of services that have various priorities. To resolve the UCI collision, the UE 110 may understand the relative priority between the PUCCH transmissions for the two services that are colliding.

In some exemplary embodiments, to resolve the collision, the UE 110 may skip the PUCCH transmission associated with the lower prioritized service, e.g., the eMBB PUCCH transmission 820.

In some exemplary embodiments, to resolve the collision, the UE 110 may partially transmit the PUCCH transmission associated with the lower prioritized service. For example, as shown in FIG. 8, the eMBB PUCCH transmission 820 may begin after completion of the URLLC PUCCH transmission 810, e.g., during the time 830. This partial transmission example may depend on the predefine processing time (e.g., N2 value). For example, if the processing time exceeds the amount of time left in the slot 805 after completion of the URLCC PUCCH transmission 810, the UE 110 may completely skip the eMBB PUCCH transmission 820.

In some exemplary embodiments, the UE 110 may decide to skip or partially transmit a lower priority PUCCH transmission (e.g., eMBB transmission 820) based on various conditions. The conditions may include, for example, a ratio of resources punctured by the URLCC PUCCH transmission 810 over the total number of resource elements of the eMBB PUCCH transmission 820. If the ratio is above a predefined threshold, the UE 110 may completely skip the eMBB PUCCH transmission 820.

Other exemplary conditions may include, the PUCCH format type, a difference in transmission power between non-overlapped symbols of the PUCCH transmissions and whether the reference symbols of the lower prioritized PUCCH transmission are punctured or not. It should be understood that these conditions may be used singularly or in any combination with other conditions for the UE to make the transmission decision with respect to the lower prioritized PUCCH transmission.

Figure 9A:
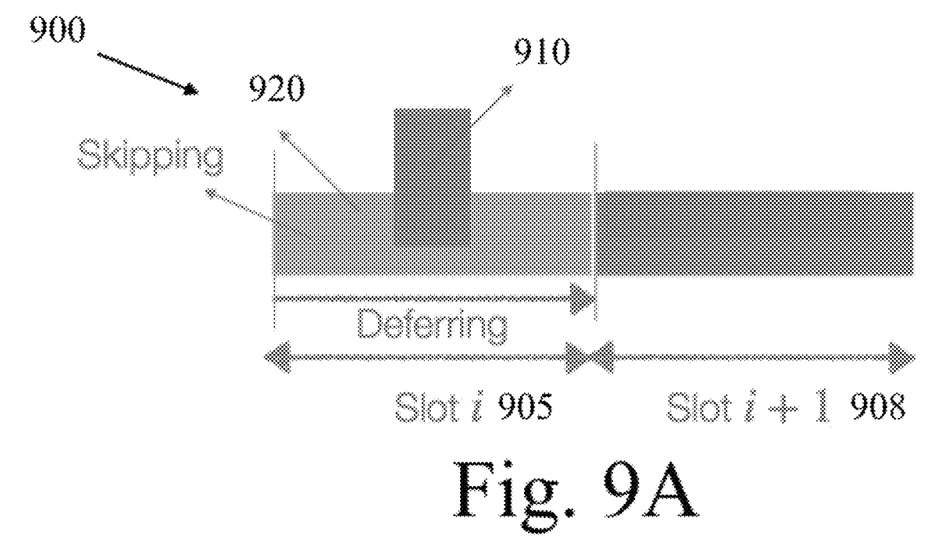
FIGS. 9A-B show further examples of UCI collisions in UL slots according to various exemplary embodiments.
Figure 9B:
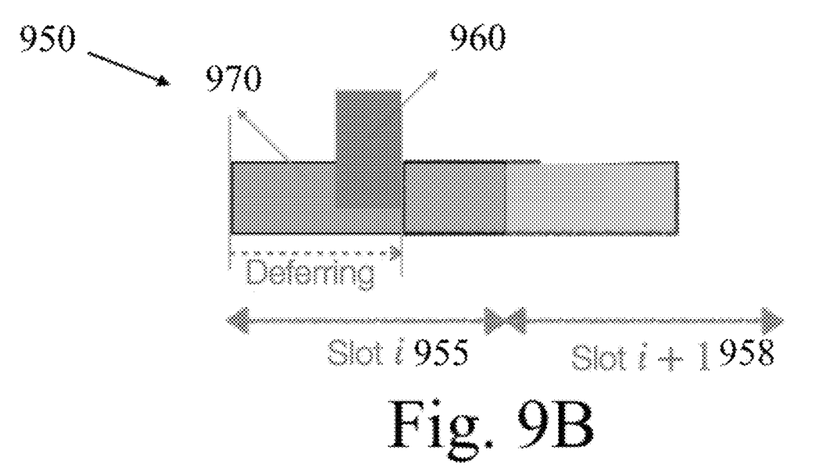

FIGS. 9A-B show further examples of UCI collisions in UL slots 905 and 955 according to various exemplary embodiments. In the example of FIG. 9A, it may be considered that there are two PUCCH transmissions scheduled for the slot 905. The PUCCH transmissions may be, for example, a higher priority PUCCH transmission 910 (e.g., for a URLLC service) and a lower PUCCH transmission 920 (e.g., for an eMBB service) being used by the UE 110. In this example, the URLLC PUCCH transmission 910 is shown puncturing the eMBB PUCCH transmission 920.

In the example of FIG. 9A, the lower priority PUCCH transmission (e.g., eMBB PUCCH transmission 920) may be deferred from the slot 905 to the next UL slot 908. This deferring of the lower priority PUCCH transmission may be autonomous, e.g., when there is such a UCI collision, the lower priority transmission is autonomously deferred to the next UL slot.

In the example of FIG. 9B, it may be considered that there are two PUCCH transmissions scheduled for the slot 955. The PUCCH transmissions may be, for example, a higher priority PUCCH transmission 960 (e.g., for a URLLC service) and a lower PUCCH transmission 970 (e.g., for an eMBB service) being used by the UE 110. In this example, the URLLC PUCCH transmission 960 is shown puncturing the eMBB PUCCH transmission 970.

In the example of FIG. 9B, the lower priority PUCCH transmission (e.g., eMBB PUCCH transmission 970) may be deferred until the completion of the higher priority PUCCH transmission ((e.g., URLLC PUCCH transmission 960). Thus, in this example, the eMBB PUCCH transmission 970 is still started in the originally scheduled slot 955 but it is deferred until the completion of the higher priority transmission. If the eMBB PUCCH transmission 970 is not completed within the slot 955, the remainder of the transmission may be completed in the next UL slot 958.

According to certain aspects of this disclosure, a set of beta-offset values may be pre-configured for a UE by RRC signaling and one or more of the beta-offset values may be dynamically selected using a beta-offset indicator field in the DCI format at least based on the PUSCH transmission. To provide an example, two beta-offset values may be configured by RRC signaling on a per UE basis. One of two configured values may be dynamically signaled by a beta-offset indicator field in the DCI format depending on the scheduled PUSCH type, e.g. eMBB Service type or URLLC service type. As one example, a smaller beta-offset value may be configured for UCI piggyback on PUSCH if PUSCH is used for URLLC to avoid performance degradation of PUSCH due to the UCI transmission.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A non-transitory computer readable storage medium comprising a set of instructions, wherein the set of instructions when executed by a processor cause the processor of a user equipment (UE) to perform operations comprising:
receiving, from a network, a plurality of Physical Downlink Shared Channel (PDSCH) transmissions in slots of a hybrid automatic repeating request acknowledgement (HARQ-ACK) window, wherein at least one of the plurality of PDSCH transmissions include a PDSCH grouping index (DGI) field configured to indicate a group index of scheduled PDSCH transmission or semi-persistent scheduling (SPS);
decoding each of the PDSCH transmissions in the slots of the HARQ window;
determining a HARQ-ACK feedback for each PDSCH transmission in the HARQ-ACK window;
bundling the HARQ-ACK feedback for at least two of the PDSCH transmissions; and
reporting the bundled HARQ-ACK feedback for the HARQ window to the network.

2. The non-transitory computer readable storage medium of claim 1, wherein the plurality of PDSCH transmissions in slots comprises a first set of PDSCH transmissions in slots received via a first component carrier (CC) and a second set of PDSCH transmissions slots received via a second CC, wherein the bundling of the HARQ feedback for the at least two PDSCH transmissions is on a per-CC basis.

3. The non-transitory computer readable storage medium of claim 1, wherein the plurality of PDSCH transmissions in slots comprises a first set of PDSCH transmissions in slots received via a first component carrier (CC) and a second set of PDSCH transmissions slots received via a second CC, wherein the bundling of the HARQ feedback for the at least two PDSCH transmissions is performed across the first and second CCs.

4. The non-transitory computer readable storage medium of claim 1, wherein the operations further comprise:
receiving, from the network, an identification of a number of PDSCH transmissions in slots in the HARQ window.

5. The non-transitory computer readable storage medium of claim 1, wherein the HARQ-ACK feedback is reported as part of uplink control information (UCI) that is reported to the network.

6. The non-transitory computer readable storage medium of claim 1, wherein the bundling comprises determining, starting from a first scheduled PDSCH transmission in the HARQ window, a number of continuous PDSCH transmissions within the HARQ window that were successfully decoded and the reporting the HARQ feedback includes reporting the number.

7. The non-transitory computer readable storage medium of claim 6, wherein reporting the number comprises reporting a HARQ-ACK state to the network, wherein a plurality of HARQ-ACK states are defined to represent the number of continuous PDSCH transmissions, starting from a first scheduled PDSCH transmission in the HARQ window, that were successfully decoded.

8. The non-transitory computer readable storage medium of claim 1, wherein the bundling comprises a logical AND operation.

9. A user equipment (UE), comprising:
a transceiver configured to connect to a network and receive, from the network, a plurality of PDSCH transmissions in slots of a hybrid automatic repeating request acknowledgement (HARQ-ACK) window, wherein at least one of the plurality of PDSCH transmissions include a PDSCH grouping index (DGI) field configured to indicate a group index of scheduled PDSCH transmission or semi-persistent scheduling (SPS);
a processor configured to decode each of the PDSCH transmissions in the slots of the HARQ-ACK window, determine a HARQ-ACK feedback for each PDSCH transmission in the HARQ-ACK window and bundle the HARQ-ACK feedback for at least two of the PDSCH transmissions,
wherein the transceiver is further configured to transmit the bundled HARQ-ACK feedback for the HARO window to the network.

10. The UE of claim 9, wherein the plurality of PDSCH transmissions in slots comprises a first set of PDSCH transmissions in slots received via a first component carrier (CC) and a second set of PDSCH transmissions slots received via a second CC, wherein the bundling of the HARQ feedback for the at least two PDSCH transmissions is on a per-CC basis.

11. The UE of claim 9, wherein the plurality of PDSCH transmissions in slots comprises a first set of PDSCH transmissions in slots received via a first component carrier (CC) and a second set of PDSCH transmissions slots received via a second CC, wherein the bundling of the HARQ feedback for the at least two PDSCH transmissions is performed across the first and second CCs.

12. The UE of claim 9, wherein the operations further comprise:
receiving, from the network, an identification of a number of PDSCH transmissions in slots in the HARQ window.

13. The UE of claim 9, wherein the HARQ-ACK feedback is reported as part of uplink control information (UCI) that is reported to the network.

14. The UE of claim 9, wherein the bundling comprises determining, starting from a first scheduled PDSCH transmission in the HARQ window, a number of continuous PDSCH transmissions within the HARQ window that were successfully decoded and the reporting the HARQ feedback includes reporting the number.

15. The UE of claim 9, wherein reporting the number comprises reporting a HARQ-ACK state to the network, wherein a plurality of HARQ-ACK states are defined to represent the number of continuous PDSCH transmissions, starting from a first scheduled PDSCH transmission in the HARQ window, that were successfully decoded.

16. The UE of claim 9, wherein the bundling comprises a logical AND operation.

* * * * *